(12) United States Patent
Clark

(10) Patent No.: US 6,419,256 B1
(45) Date of Patent: Jul. 16, 2002

(54) NOISE FEEDBACK FOR TRAINING WHEELS

(76) Inventor: Richard R. Clark, 265 Chelaque Way, Mooresburg, TN (US) 37811

( * ) Notice: Subject to any disclaimer, the term of this patent is extended or adjusted under 35 U.S.C. 154(b) by 0 days.

(21) Appl. No.: 09/838,881

(22) Filed: Apr. 20, 2001

(51) Int. Cl.$^7$ .................................................. B60Q 1/26
(52) U.S. Cl. ..................................... 280/288.4; 116/56
(58) Field of Search ............................. 280/288.4, 293, 280/1.14; 446/404, 409, 440, 448; 116/3, 56

(56) References Cited

U.S. PATENT DOCUMENTS

| | | |
|---|---|---|
| 1,276,747 A | 8/1918 | Foljambe |
| 2,578,682 A | 12/1951 | Fernstrom |
| 3,302,954 A | 2/1967 | Elwell |
| 4,270,764 A | 6/1981 | Yamada |
| 5,611,558 A | 3/1997 | Randmae |
| 6,039,338 A | 3/2000 | Perea et al. |

*Primary Examiner*—Avraham Lerner
*Assistant Examiner*—Matthew Luby
(74) *Attorney, Agent, or Firm*—Pitts & Brittian, P.C.

(57) ABSTRACT

A system for sound generation and noise feedback is disclosed for attachment to a bicycle training wheel. The system includes a plurality of sound generators attachable by a means for fastening to a rotatable surface of the training wheel. As the sound generators rotate with the wheel, sound is generated in proportion to the speed of wheel rotation. The sound generation system further includes a sound generator attachable to the support frame of a bicycle wheel. A clapper is pivotably attachable proximal to the sound generator, for intermittent contact with the sound generator when the clapper is engaged by one or more projections connected to, and rotated by the wheel. The generation and feedback system further includes a light generator and an electrical circuit connected to the sound generator for intermittent generation of sound and light in proportion to the rotation of the training wheel.

4 Claims, 5 Drawing Sheets

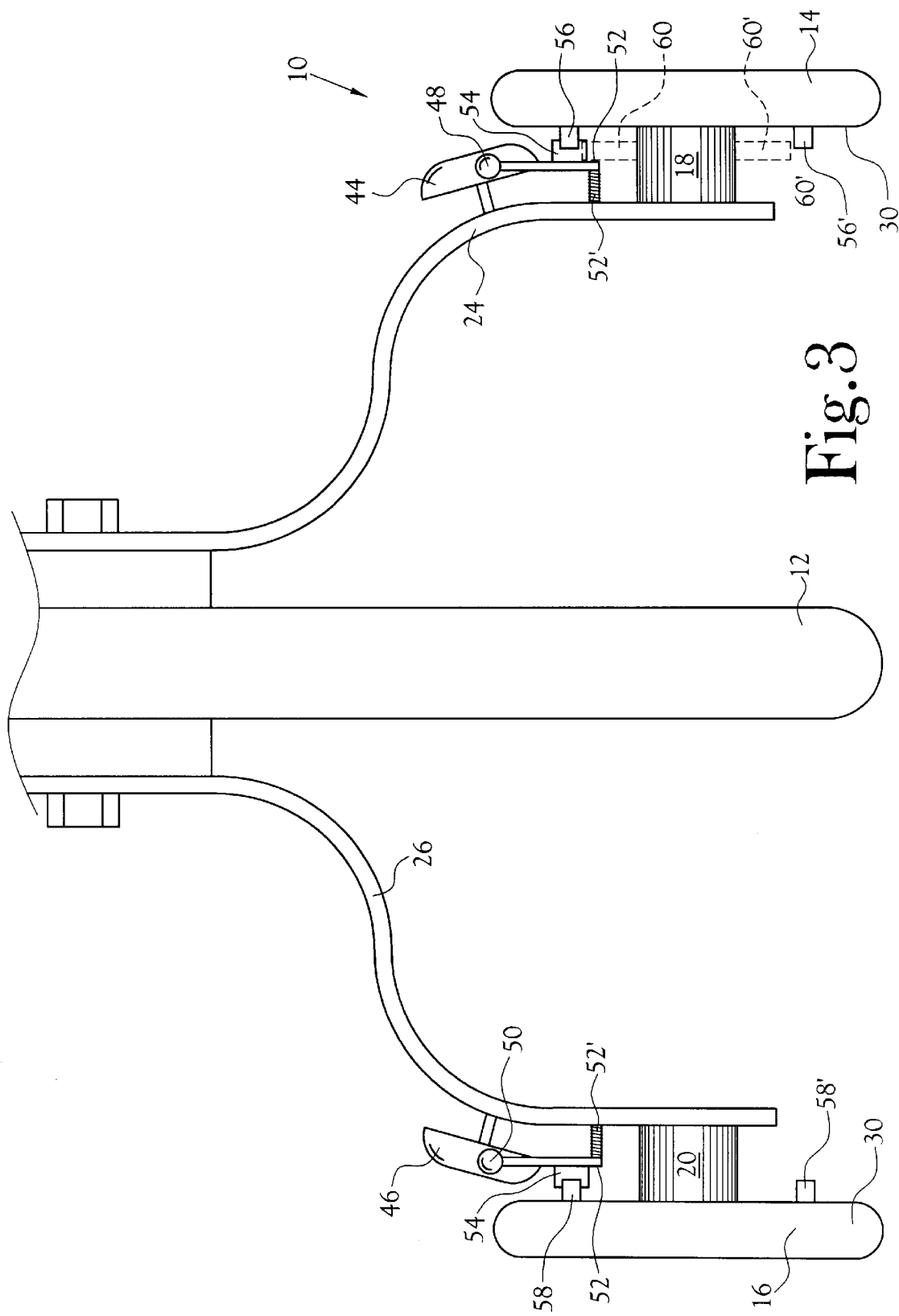

NOISE FEEDBACK FOR TRAINING WHEELS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of Invention

The present invention relates to an apparatus for sound feedback for bicycle wheels. More specifically, this invention relates to a system for sound generation and noise feedback for training wheels attached to a bicycle.

2. Description of the Related Art

Prior devices have provided sound generation devices attached to the front and/or rear wheels of a bicycle or tricycle. The prior sound generation devices have included pliable flaps or flexible strips of material that are connected by clamps and suspended from the support frame of a bicycle wheel for intermittent contact with the spokes of the bicycle wheel as the wheel rotates. These prior devices require periodic replacement of the flaps or strips of material due to breakage and wear from contact with the spokes, and typically provide the same repetition of noise from the spokes of the rotating wheel.

BRIEF SUMMARY OF THE INVENTION

In accordance with the present invention there is provided a system for sound generation and noise feedback for wheels attached to a bicycle. The present invention includes one sound generator, or a plurality of sound generators, attachable to an interior or outer surface of a bicycle training wheel. Each sound generator includes a means for fastening to the bicycle training wheel, to allow each sound generator to rotate with the wheel for generation of sound in proportion to the speed of rotation of the bicycle training wheel.

The present invention further includes a sound generator apparatus attachable to a training wheel connected by a support frame to a bicycle wheel. The apparatus includes a sound generator attachable to the support frame and positioned proximal to an interior surface of the training wheel. A clapper is pivotably extended from the support frame to intermittently contact the sound generator. The clapper includes a pivotable first end extended from the support frame, and includes a mid-portion disposed to be intermittently engaged by a projection extended from the interior surface of the training wheel. Each rotation of the training wheel provides for intermittent engagement of the projection against the mid-portion of the pivotable clapper, which contacts the sound generator for sound generation and noise feedback in proportion to the rotation of the training wheel.

BRIEF DESCRIPTION OF THE SEVERAL VIEWS OF THE DRAWINGS

The present invention is illustrated in the drawings in which:

FIG. 2b is a front side view of one sound generator of FIG. 2a;

FIG. 2c is a back side view of the sound generator of FIG. 2b;

FIG. 3 is a rear view of an alternative embodiment of the system for sound generation and noise feedback, illustrating a pair of sound generators and clappers positioned respectively on separate training wheel supports;

DETAILED DESCRIPTION OF THE INVENTION

Figure 1:
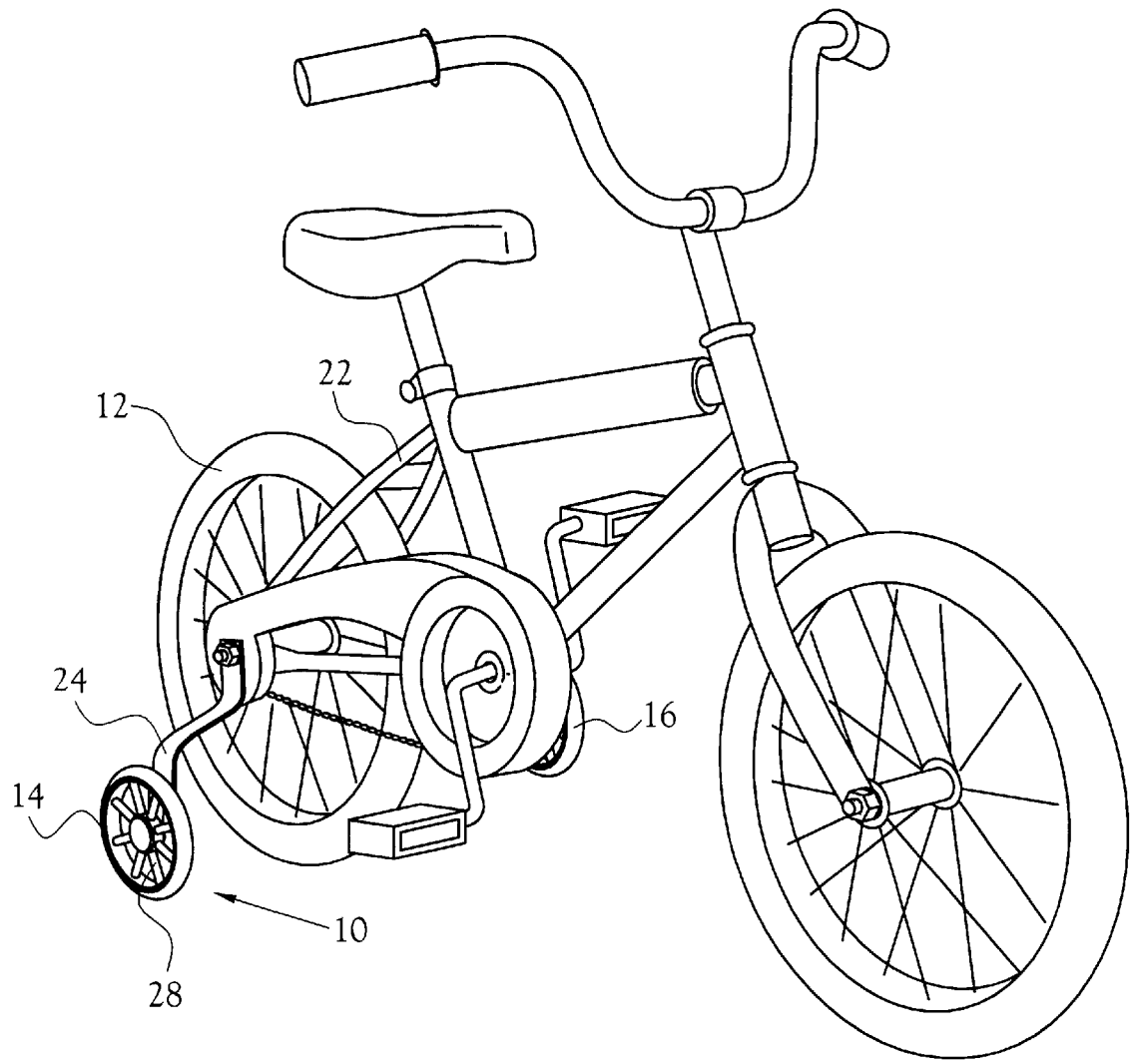
FIG. 1 is a perspective side view of one embodiment of a system for mounting thereon the sound generation and noise feedback system of the present invention.

In accordance with the present invention and referring initially to FIG. 1, one embodiment of a sound generation system 10 for a bicycle wheel 12 includes a pair of training wheels 14, 16 attached to each side of the bicycle wheel 12 by respective support frames 24, 26 (see FIG. 3). The training wheels are shaped in a general configuration known to those skilled in the art, with each support frame 24, 26 connectable between each respective hub 18, 20 and each respective side of the frame 22 supporting the bicycle wheel 12. Each hub 18, 20 forms an axle of, and rotates with, the respective training wheel 14, 16 and bicycle wheel 12.

Figure 2A:
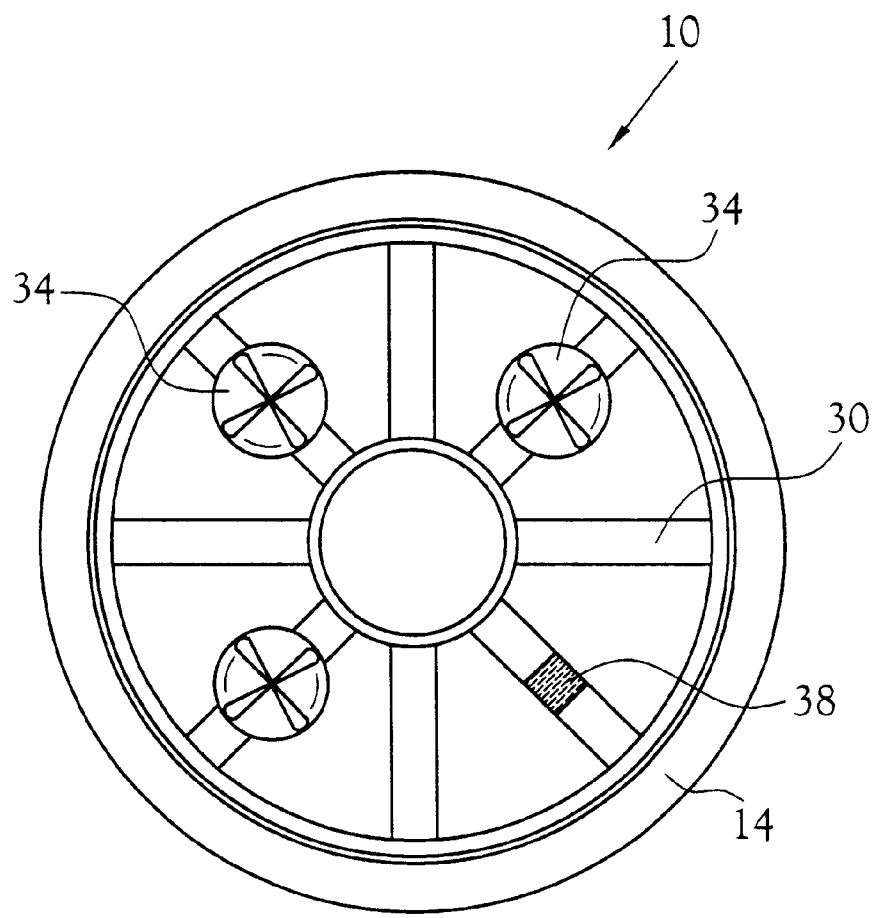
FIG. 2a is a side view of the sound generation and noise feedback system of FIG. 1, illustrating a bicycle training wheel having a plurality of sound generators thereon.
Figures 2B, 2C:
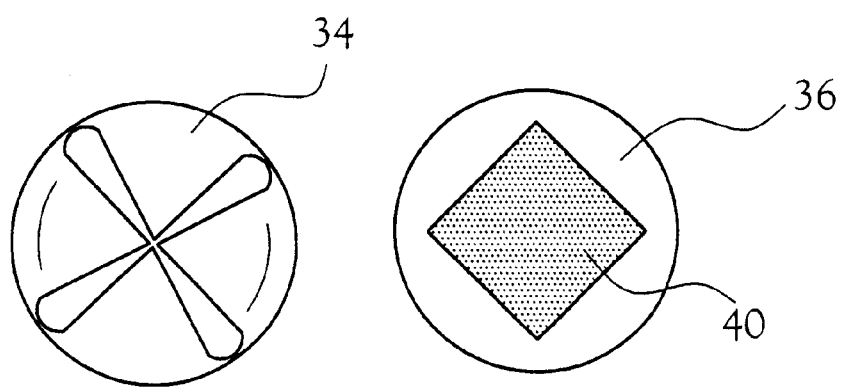

One embodiment for the sound generation system 10 includes one cylindrical bell 34 that is releasably attachable to one of the training wheels 14, 16 (see FIGS. 2a and 2b). An alternative embodiment includes a plurality of cylindrical bells 34 that are releasably attachable to one or both of the training wheels 14, 16. One connecting means for attaching each cylindrical bell 34 includes a hook and loop type fastener material (see FIGS. 2a and 2c). The hook portion 38 of the fastener material is attached to a portion of the exterior side surface 28 or the interior side surface 30 of the respective training wheel 14, 16. The loop portion 40 of the fastener is attached to a first portion 36 of the surface of each respective cylindrical bell 34. Alternatively, the positioning of the hook portion and the loop portion of the fastener material is interchangeable to allow attachment of the loop portion upon one of the side surfaces 28, 30 of each respective training wheel 14, 16, and to allow attachment of the hook portion to a first portion 36 of the surface of each respective cylindrical bell 34. Those skilled in the art will recognize that the hook and loop type fastener is replaceable with a loop and strap configuration, or similar connectors for securing each cylindrical bell to each respective training wheel 14, 16. Upon fastening of the plurality of cylindrical bells 34 on one or both training wheels, the cylindrical bells 34 generate a sound in proportion to the size, shape, and materials of construction of each bell (see FIG. 2b). The cylindrical bells 34 rotate with the rotation of the training wheels 14, 16, therefore providing noise feedback to the rider for the entertainment of the rider and/or spectators.

An alternative configuration of the sound generation system 10 includes a first sound generator 44 that is attachable to a first support frame 24 (see FIG. 3). The sound generator 44 is oriented to extend outwards from the first support frame 24 for positioning proximal to the training wheel 14. The sound generator 44 includes a bell or a similar device that emits a sound when intermittently contacted. A first clapper end 48 is positioned proximal to the sound generator 44. The clapper end 48 is supported by a first end 52 that is connected by a pivoting connection to the first support frame 24. The pivoting connection for the first end 52 includes a coiled spring 52' for returning the pivoting first end 52 from an engaging position having the clapper end 48 strike the sound generator 44, to a neutral, non-engaging position having the clapper end 48 moved away from the sound generator 44. The spring tension of the coiled spring 52' of the first end 52 provides adequate recoil tension to pivot the first end 52 and clapper end 48 back to the non-engaging position away from the sound generator 44. An alternative spring-loaded device for returning the clapper end 48 to a non-engaging position is utilizable by those skilled in the art. Between the clapper end 48 and the first end 52 is a mid-portion 54 segment that extends toward the interior surface 30 of the training wheel 14.

At least one projection 56 is connected proximate to the interior surface 30 of the training wheel 14, for repetitive engagement of the mid-portion 54 segment by the projection 56 during rotation of the hub 18 and training wheel 14. Upon engagement by the projection 56 against the mid-portion 54 segment, the first end 52 rotates and the clapper end 48 contacts the bell of the sound generator 44. An additional embodiment provides a second projection 56' positioned on a portion of the interior surface 30 that is approximately 180° along the interior surface 30 and on an opposed side of the hub 18 from the first projection 56 (see FIG. 3). The projections 56, 56' extend inwards toward the bicycle frame 22 from the interior surface 30 of the training wheel 14 (see FIG. 3). An alternative embodiment for the projections provides one or two projections extended radially outwards 60, 60' from the perimeter of the hub 18 (see FIG. 3). As each projection 56, 56' is rotated with the rotation of hub 18 and interior surface 30 of the training wheel 14, the projection 56 engages the mid-portion 54 segment of the clapper end 48, forcing the pivoting and contacting of the clapper end 48 against the bell of the sound generator 44. A ringing sound from the first sound generator 44 is generated in proportion to the speed of revolution of the hub 18, training wheel 14, and the bicycle wheel 12, therefore providing noise feedback to the rider for the entertainment of the rider and/or spectators.

An alternative embodiment for the sound generation system 10 includes at least two sound generators 44, 46 that are separately connectable to respective support frames 24, 26 (see FIG. 3). Each support frame 24, 26 is attachable to the bicycle frame 22 for support of the training wheels 14, 16 on opposed sides of the rear bicycle wheel 12. A second sound generator 46 is positioned to extend from a second support frame 26 in proximity to the hub 20 of a second training wheel 16. At least one projection 58 extends inwards from the interior surface 30 of the second training wheel 16, for a sufficient distance to intermittently engage the mid-portion 54 segment as the second training wheel 16 rotates. As the projection 58 is rotated with the rotation of the interior surface 30 of the second training wheel 16, the projection 58 engages the mid-portion 54 segment to force clapper end 50 to intermittently contact the second sound generator 46.

Figures 4A, 5A:
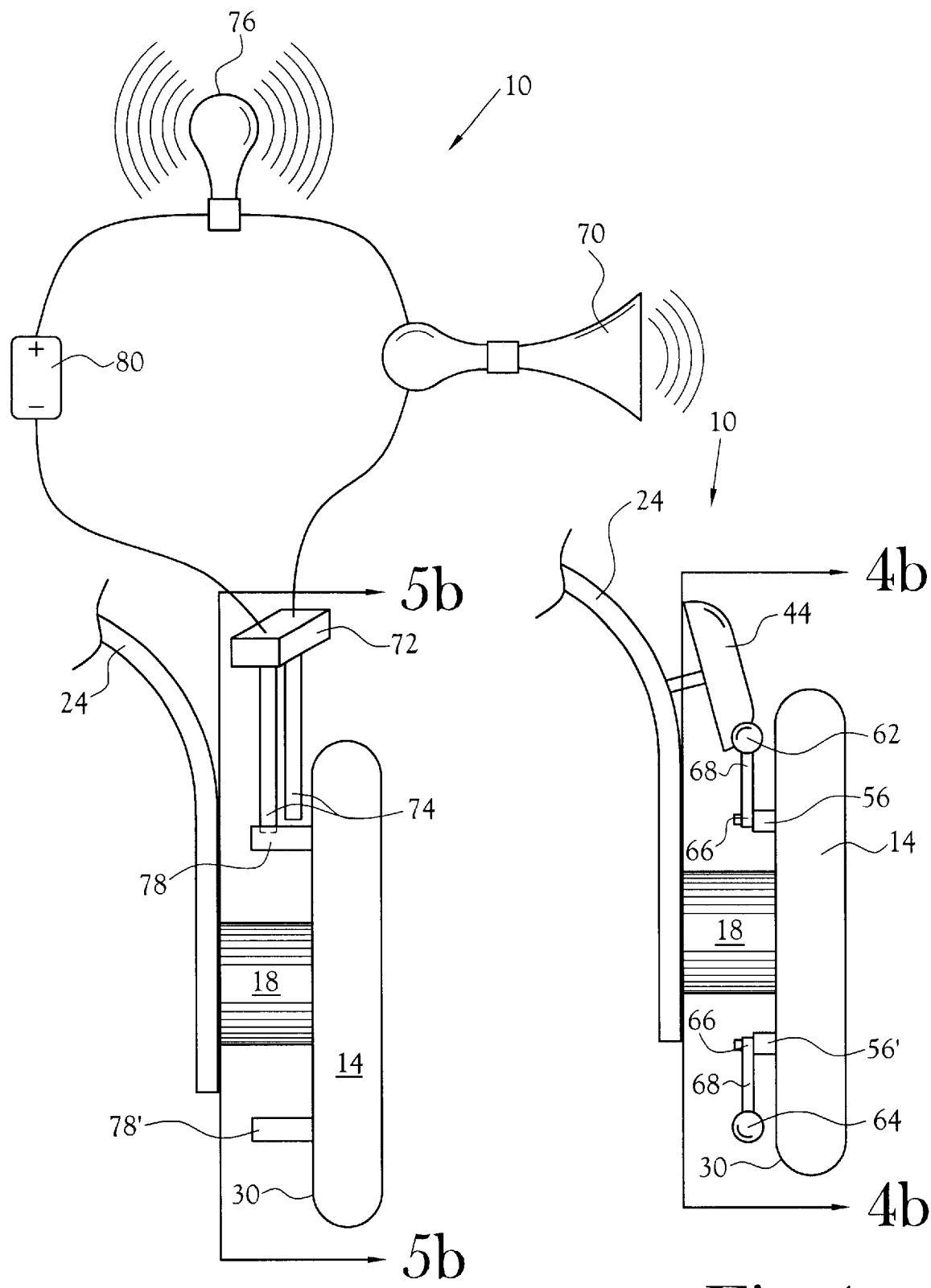
FIG. 4a is a rear view of an additional alternative embodiment of the system for sound generation and noise feedback, illustrating a first sound generator and a pair of clappers positioned to contact the first sound generator upon rotation of the first training wheel.
FIG. 5a is a rear view of a further alternative embodiment of the system for sound generation and noise feedback, illustrating a sound and light generator and an electrical switch for activating the sound and light generator.

An additional alternative embodiment for the sound generation system 10 includes at least one sound generator 44 that is connectable to the support frame 24 (see FIG. 4a). The sound generator 44 includes at least one bell that is extended from the respective support frame 24 and is positioned proximate the interior surface 30 of the first training wheel 14. A second sound generator 46 may be connectable to a second support frame 26 as shown generally in FIG. 3. For repetitive and intermittent contact with the first sound generator 44, a rotatable clapper 62 is connectable at a rotating first end 66 at a perimeter position on the interior surface 30 of the training wheel 14 (see FIG. 4a and 4b). A second clapper end 68 of the rotatable clapper 62 is allowed to swing in a substantially vertical plane parallel with the rotation of the first training wheel 14 due to centrifugal force generated as the training wheel 14 rotates. Sounds are generated from the first sound generator 44 upon intermittent engagement by the rotatable clapper 62 in proportion to the speed of rotation of training wheel 14 and bicycle wheel 12.

Figure 4B:
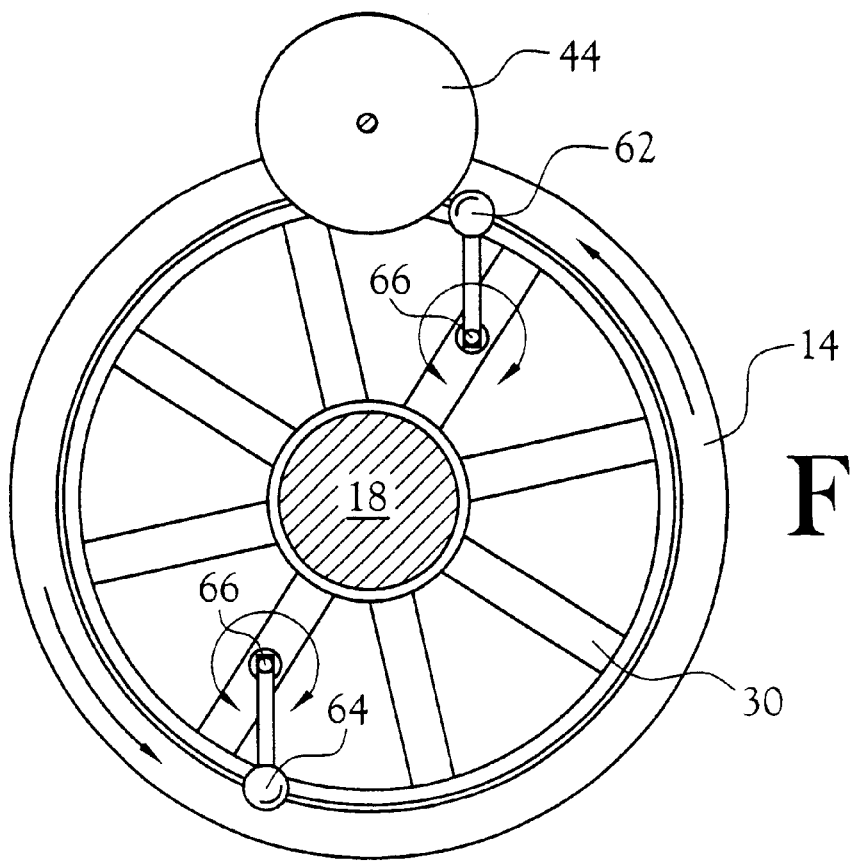
FIG. 4b is a side view, in section along 4b—4b of FIG. 4a, illustrating an interior surface of the first training wheel having the pair of clappers positioned to contact the first sound generator.

A second rotatable clapper 64 is connectable at a first pivot end 66 to a perimeter position on the interior surface 30 of the first training wheel 14 (see FIGS. 4a and 4b). A second end 68 of the second rotatable clapper 64 is allowed to swing in a substantially vertical plane parallel with the rotation of the first training wheel 14 due to centrifugal force generated as the first training wheel 14 rotates. The rotatable clappers 62, 64 may be positioned at opposed perimeter positions along the perimeter of the interior surface 30 on the first training wheel 14, therefore generating sound and providing noise feedback from the first sound generator 44 at a more frequent rate than one rotatable clapper 62. Sound from the second sound generator 46 is generated by similar positioning of one clapper 62, or two clappers 62, 64 on the interior surface 30 of second training wheel 16.

Figure 5B:
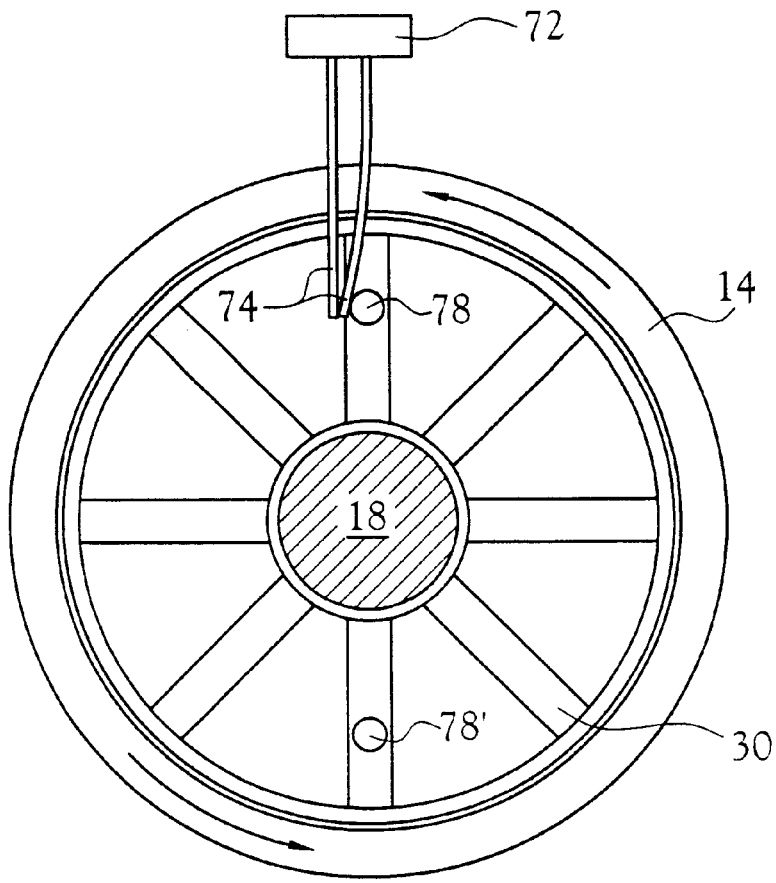
FIG. 5b is a side view, in section along 5b—5b of FIG. 5a, illustrating an interior surface of the first training wheel having a means for engagement of the electrical switch for activating the sound and light generator.

A further alternative embodiment for the sound generation system 10 includes a light generator, a sound generator, an electrical switch and associated circuitry, and a power supply combined with a modified sound generator configuration for intermittent generation of sound and light from a training wheel 14 (see FIGS. 5a and 5b). A sound generator 70 is attachable to the first support frame 24 and is oriented to extend outwards from the first support frame 24 for positioning proximal to the interior surface 30 of the training wheel 14. The sound generator 70 includes a horn or a similar device that issues sounds when electrically activated. A light generator 76 is attached to the first support frame 24 and is positioned proximal to the sound generator 70. In the alternative, the light generator 76 may be attached on a front or rear portion of the bicycle frame 22, instead of being attached to the first support frame 24. The light generator 76 and sound generator 70 are in electrical connection with each other, and are in electrical connection with an electrical switch 72 that includes associated circuitry for controlling the triggering of lights by the light generator 76 and the triggering of sound by the sound generator 70.

The electrical switch 72 includes at least one elongated contact circuit having a first distal end 74 and a second distal end 74' being disposed in parallel relationship (see FIG. 5a and 5b). The electrical switch 72 and elongated contact circuit are attachable at a first end to the first support frame 24, and the distal ends 74, 74' extend proximal to the interior surface 30 of the training wheel 14. One embodiment of the elongated contact circuit includes the distal ends 74, 74' being separated by a predetermined distance of approximately a fraction of an inch. The distal ends 74, 74' are composed of a partially rigid metal such as spring steel, or a similar rigid material that conducts electrical current when an electrical conductive pathway is established. One or both of the partially rigid distal ends 74, 74' are periodically bent by an intermittent and repetitive force provided by the engagement of at least one projection 78 rotated past the distal ends, therefore forcing together distal ends 74, 74' for intermittent contact with each other.

A power supply 80 is attachable to the support frame 14 to provide a source of electricity for the sound generator 70, the light generator 76, the electrical switch 72, and associated circuitry. The power supply 80 may include replaceable batteries, and/or an electricity generator attached to the bicycle frame 22 in proximity to the bicycle rear wheel 12. When the partially rigid distal ends 74, 74' are forced together, a complete electrical circuit is maintained for a brief period of time to allow the electrical switch 72 and associated circuitry to activate the sound generator 70 and the light generator 76.

At least one projection 78 is connectable on, and extended from, the interior surface 30 of the training wheel 14. The projection 78 extends inwards toward the bicycle wheel 12 from the interior surface 30 of the training wheel 14, or alternatively may extend radially outwards from the hub 18 for a sufficient distance to periodically engage the distal end 74, 74' of the elongated contact 74. As the projection 78 is rotated with the rotation of hub 18 and interior surface 30, the projection 78 engages one or both of the distal ends 74, 74' to force them together intermittently, therefore allowing an electrical circuit connection to be established for activation of the sound generator 70 and the light generator 76. An alternative configuration provides at least two projections 78, 78' that are positioned proximal to the hub 18 and/or the perimeter of the interior surface 30 of one training wheel 14. One projection 78 may be spaced apart along the perimeter of the interior surface 30 approximately 180° from the second projection 78'. As each projection 78, 78' is rotated with the rotation of hub 18 and interior surface 30 of the training wheel 14, the projections intermittently engage distal ends 74, 74' to force them together periodically, therefore allowing an electrical circuit connection to be established for activation of sound generator 70 and the light generator 76. Intermittent sounds and flashing lights are generated in proportion to the speed of rotation of the training wheel 14 and bicycle wheel 12, therefore providing noise feedback for entertainment of the rider and spectators.

As the distal ends 74, 74' are periodically forced together by engagement by each projection 78, 78', the electrical switch 72 and associated circuitry may be programmed to maintain activation of either the light generator 76, or the sound generator 70, or to alternate activation of both, as the bicycle wheel 12 and training wheels 14, 16 are rotated. An additional embodiment includes circuitry that is connected to a radio or similar music playing device carried on the bicycle frame 22. The electrical switch 72 and associated circuitry may be programmed to generate music when the training wheel 14 is not being rotated, or to generate music when the training wheel 14 is being rotated, with intermittent light activation from the light generator 76, and/or intermittent sound activation from the sound generator 70 when the distal ends 74, 74' are periodically forced together by engagement by each projection 78, 78'.

An additional alternative embodiment for the sound generation system 10 includes attachment of at least two sound generators 44, 46 to support frames for each rear wheel of a tricycle. A further alternative embodiment for the sound generation system 10 includes attachment of at least two sound generators 44, 46 to the support frame of a front wheel of a bicycle or tricycle. Each sound generator is engaged by either the pivotable first end 52 and clapper end 48 configuration discussed above, or by the free-swinging rotatable clapper 62 configuration discussed above.

While a preferred embodiment for the foregoing is shown and described, it is understood that the description is not intended to limit the disclosures, but rather is intended to cover all apparatus modifications and alternate methods of operation falling within the spirit and the scope of the invention as defined in the appended claims.

I claim:

1. A feedback generation system for a bicycle wheel including a training wheel attachable by a support frame to the bicycle wheel, the training wheel having an interior surface rotatable with the bicycle wheel, said feedback generation system comprising:

a sound generator attachable to the support frame, said sound generator positioned proximate to an interior surface of the training wheel;

an electrical switch having an electrical circuit in electrical connection with said sound generator, said electrical switch including a first distal end and a second distal end disposed in a parallel relationship, said first and said second distal end extended toward the interior surface of the training wheel;

a power supply positioned in electrical connection with said electrical switch and said sound generator; and at least one projection positioned on the interior surface of the training wheel, said at least one projection extended from the interior surface at a preselected distance for intermittent engagement of said first and said second distal ends of said electrical switch as said at least one projection is rotated with the rotation of the training wheel;

whereby said first and said second distal ends are forced together upon intermittent engagement with said at least one projection, thereby said electrical switch is intermittently activated and said sound generator is intermittently activated in proportion to the rotation of the training wheel.

2. The feedback generation system of claim 1, wherein said system further comprising:

a light generator attachable proximal to said support frame;

said light generator positioned proximal to said sound generator;

said electrical switch having said electrical circuit in electrical connection with said light generator and said sound generator; and said power supply in electrical connection with said light generator, said electrical switch, and said sound generator;

whereby said first and said second distal ends are forced together upon intermittent engagement with said at least one projection, thereby said electrical switch is intermittently activated and said light generator and sound generator are intermittently activated in proportion to the rotation of the training wheel.

3. The feedback generation system of claim 2, wherein said first and said second distal ends are composed of spring metal, said first and said second distal ends being forced together from said parallel relationship when said at least one projection intermittently engages said first and said second distal ends in proportion to the rotation of the training wheel, whereby said electrical switch, said sound generator, and said light generator are intermittently activated in proportion to the rotation of the training wheel.

4. The feedback generation system of claim 3, said electrical switch is deactivated when said first and said second distal ends return to said parallel relationship after said at least one projection is rotated past said first and said second distal ends, whereby said sound generator and said light generator are intermittently deactivated in proportion to the rotation of the training wheel.

* * * * *